United States Patent [19]

Kerscher et al.

[11] 4,280,398
[45] Jul. 28, 1981

[54] RAPID RELEASE MECHANISM FOR A SPRING-LOADED BRAKE CYLINDER

[75] Inventors: Albert Kerscher, Eching; Walter Furtner, Rosenheim, both of Fed. Rep. of Germany

[73] Assignee: Knorr-Bremse GmbH, Munich, Fed. Rep. of Germany

[21] Appl. No.: 974,230

[22] Filed: Dec. 29, 1978

[30] Foreign Application Priority Data

Jan. 5, 1978 [DE] Fed. Rep. of Germany ....... 2800449

[51] Int. Cl.³ .............................................. F01B 9/00
[52] U.S. Cl. .......................................... 92/29; 92/63; 92/129; 92/130 A; 92/143
[58] Field of Search ................. 92/63, 64, 129, 130 A, 92/143, 9, 29, 85 R, 85 A, 85 B

[56] References Cited

U.S. PATENT DOCUMENTS

| | | | |
|---|---|---|---|
| 1,548,182 | 8/1925 | Burgin | 92/85 R |
| 3,685,501 | 8/1972 | Honda | 92/85 B |
| 3,782,251 | 1/1974 | Le Marchand | 92/130 A |
| 4,080,876 | 3/1978 | Sturgess | 92/130 A |

FOREIGN PATENT DOCUMENTS 2702874  7/1978  Fed. Rep. of Germany .

*Primary Examiner*—Abraham Hershkovitz
*Attorney, Agent, or Firm*—Edmund M. Jaskiewicz

[57] ABSTRACT

A spring-loaded braking cylinder has a rapid release mechanism which disengageably connects the spring-loaded piston with the piston rod. A damping mechanism damps the relative movement between the piston and the piston rod which occurs upon release of the coupling between the spring-loaded piston and the piston rod. The piston rod is coupled to the piston by a transverse pin a portion of which projects into a transverse slot on the piston rod and another portion of which is movable within an L-shaped slot on the piston rod. An adaptor connected to the pin has a flange which acts as a piston within a closed chamber formed with the piston rod and filled with fluid. The spaces on both sides of the piston-like flange are interconnected by throttle passages. The damping mechanism may also comprise a rotary pump structure in parallel with a clutch between the piston rod head and the actuating member where the releasable coupling is constructed as a threaded spindle and clutch nut threaded into each other by means of an non-self-locking thread of a linkage adjustment mechanism and a releasable coupling is provided between the piston rod head and an actuating member extending from the adjustment mechanism.

5 Claims, 3 Drawing Figures

RAPID RELEASE MECHANISM FOR A SPRING-LOADED BRAKE CYLINDER

The present invention relates to a rapid release mechanism for a spring-loaded brake cylinder, more particularly, to a damping structure for the rapid release mechanism.

In a spring-loaded brake cylinder, the piston is urged into the braking position by a spring acting upon one side of the piston. When pressure fluid is withdrawn from the other side of the piston the force of the spring moves the piston into the braking position. In order to release the piston from the braking position a pressure medium, usually compressed air, is introduced against the side of the piston away from the spring. However, it has occurred that sufficient pressure medium to release the brake cylinder is lacking because of some damage to the pressurized air supply which constitutes te pressure medium. Thus, it is desirable to equip such spring-loaded brake cylinders with a release mechanism which is simple in structure but which mechanically permits the release of the spring-loaded piston in the brake cylinder.

Numerous designs and constructions of such release mechanisms have been proposed and are based essentially on the release of the frictional connection in the spring - piston - piston rod - piston rod head sequence. This sequence may also include the brake linkage. It has also been proposed to incorporate such a release mechanism in the connection between the piston and piston rod where the piston rod may comprise a tubular element. Other proposals have included constructing the piston rod in two parts which are disengageable from each other.

In general, when such a spring-loaded brake cylinder is released by disengaging or uncoupling the frictional connection between some of the components as described above, the piston rod is suddenly subjected to powerful acceleration forces. These forces are due on one hand because of the substantial amount of energy stored in the spring-loaded piston and on the other hand by the energy stored in the brake linkage. These acceleration forces may cause considerable impact forces between components which are not designed to be subjected to such forces. The result may be a harmful and damaging effect on such components of the brake cylinder so as to significantly reduce the operating life thereof.

It is therefore the principal object of the present invention to provide a novel and improved release mechanism for a spring-loaded brake cylinder.

It is another object of the present invention to provide a damping structure for a release mechanism of a spring-loaded brake cylinder so as to avoid high impact forces which may result from the relative movement of several components with respect to each other.

It is a further object of the present invention to provide a quick release mechanism for a spring-loaded brake cylinder which is simple construction, reliable in operation and when actuated to bring about a release operation decreases forces stored in the spring-loaded piston or in the brake linkage in a controlled manner.

According to one aspect of the present invention a spring-loaded brake cylinder has a spring-loaded piston which is movable between the release and braking positions. A piston rod head which is adapted to be connected to te brake linkage is actuable by piston rod means which are relatively movable with respect to the piston. A releasable coupling operatively connects the piston and the piston rod means. A damping means is provided in parallel with the releasable coupling so as to damp relative movement between the piston and the piston rod means resulting when the releasable coupling is released.

In a modification, the spring-loaded brake cylinder has a spring-loaded piston movable between release and braking positions and piston rod means extending from the piston. A piston rod head which is adapted to be connected to a brake rigging is actuated by means operatively connected to the piston rod means. The actuating means is relatively movable with respect to the piston rod head. A releasable coupling operatively connects the actuating means and the piston rod head. In parallel with the releasable coupling is a mechanism for damping relative movement between the actuating means and the piston rod head resulting when the releasable coupling is released. The damping mechanism comprises a rotary pump rotatable in a chamber filled with fluid.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figures 1, 3:
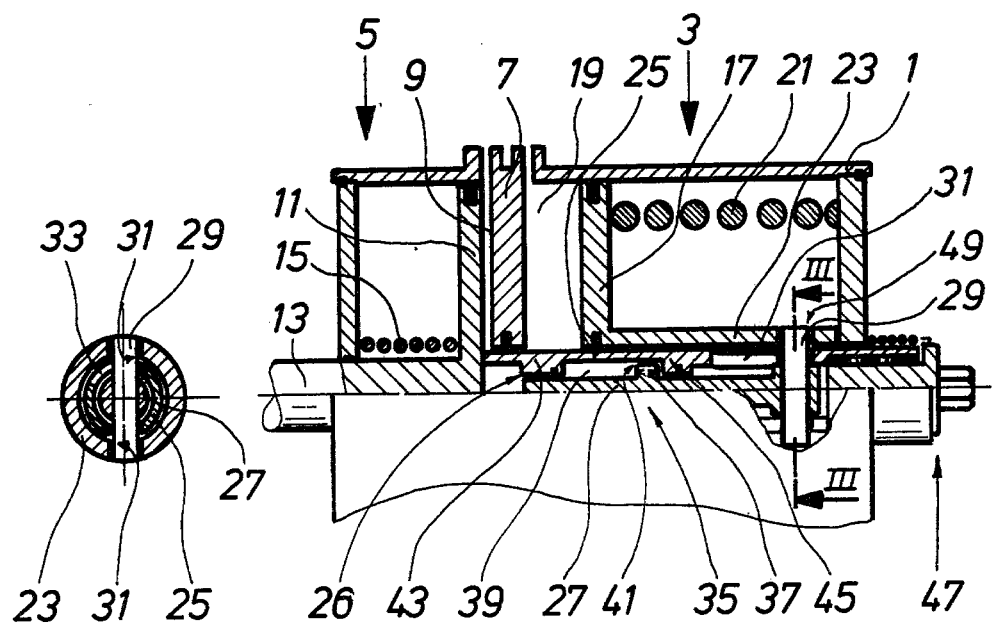
FIG. 1 is a longitudinal cross-sectional view through a half of a spring-loaded brake cylinder provided with the rapid release mechanism according to the present invention.
FIG. 3 is a sectional view taken along the line III—III of FIG. 1.

As may be seen in FIG. 1, a brake cylinder housing 1 encloses both the spring-loaded brake cylinder indicated generally at 3 and an operating brake cylinder indicated generally at 5 which are separated from each other by a housing partition or wall 7.

The operating brake cylinder 5 has a chamber 9 defined by the wall 7 and by a face of piston 11 into which a pressure medium, which may be compressed air, is introduced in order to shift a piston rod head 13 in the braking direction against the force of a return spring 15.

In the spring-loaded cylinder 3, a spring-loaded piston 17 is shown in its released position in FIG. 1 and is maintained in this position by means of a pressure medium in a chamber 19 defined by the wall 7 and a face of the piston 17. The pressure in chamber 19 acts against the force of a storage spring 21 positioned between the crank face of piston 17 and an end wall of the brake cylinder 5.

A tubular element or casing 23 is fixedly connected to the spring side of the piston 17 and extends axially therefrom. Within the tubular element 23 is an axially displaceable piston rod 25 which is provided with an axial bore or passage 26 therethrough. The left end of piston rod 25 as viewed in FIG. 1 or the front end passes through a central opening in the wall 7 provided with suitable seals or packing so as to seal this opening against air. The front end of the piston rod 25 is engageable with the piston 11 of the operating brake cylinder 5. An adaptor 27 is rotatably and axially movably positioned within bore 26 and the adaptor 27 is provided with a transversely extending coupling pin or rod 29 the upper end of which is received in a transverse slot 49 in the tubular element 23 so that the tubular element 23 and the adaptor 27 are secured against axial displacement with respect to each other.

A middle portion of the coupling pin 29 passes through an L-shaped slot in the tubular piston rod 25 and this slot comprises an axially extending portion 31 and a transversely extending portion 33. When the components are in the release position as shown in FIG. 3 the transverse slot 33 is in a radial plane and extend laterally from the coupling pin 29 as shown in FIG. 3.

According to the present invention a damping mechanism indicated generally at 35 is provided in the bore 26 between the piston rod 25 and adaptor 27. The damping mechanism 35 comprises a liquid displacing member 37 constructed as an external flange on the outer surface of the adaptor 27. The outer peripheral surface of the flange 37 is spaced radially from the inner surface of the bore 26 so as to define a radial clearance 41 adjacent the outer cylindrical boundary wall of an annular chamber 39 in the bore 26 of the piston rod 25. The annular chamber 39 is defined by two annular pistons 43 and 45 which are formed as internal flanges on the surface of the bore 26 and positioned a fixed distance from each other within the bore 26. The annular piston 45 is further away in an axial direction form the piston 17 than the annular piston 43 when the piston 17 is in its release position. The chamber 39 is filled with a fluid, such as a hydraulic fluid.

The adaptor 27 to which the coupling pin 29 is firmly attached can be pivoted in the bore 26 around its longitudinal axis by means of a manually operable release mechanism which is operable from a point outwardly of the brake cylinder and which is indicated generally at 47. The operation of the release mechanism is known in the art and is not described in greater detail. Pivoting of the release mechanism 47 will in turn pivot the adaptor 27 around its longitudinal axis and will thus move the outer radial ends of the coupling element 29 in a transverse direction in the transverse slot 33 of the piston rod 25 and in the transverse slot 49 at the end of the tubular element 23.

The rapid release mechanism operates in the following manner: During a braking operation, the chamber 19 which is filled with compressed air at a sufficient pressure to maintain the piston 17 in the released position as shown in FIG. 1 against the force of spring 21 is exhausted progressively during a normal service braking or evacuated suddenly during an emergency braking operation. Decreasing the pressure in the chamber 9 enables the spring 21 to move piston 17 to the left as viewed in FIG. 1 and the piston rod 25 acts upon the piston 11 to move the piston 11 and piston rod head 13 to the left in the braking direction. This movement of the piston 11 to the left is against the force of the return spring 15. Upon completion of the braking operation, air under pressure is introduced into the chamber 19 and the piston 11 will be moved to the right by the air under pressure acting against the force of spring 21. The movement of the piston 17 to the right together with its piston rod 25 will enable the return spring 15 to also move piston 11 to the right into its release position as shown in FIG. 1.

If it is desired to apply the brakes to a vehicle which is stationary and the braking system is disconnected, the chamber 19 is then vented. Upon venting chamber 19, the spring 21 shifts the spring-loaded piston 17 together with the tubular element 23 to the left. The coupling pin which is engaged in transverse slot 49 in tubular element 23 and in the transverse slot 33 of the piston rod 25 acts to also shift the piston rod 25 and similarly the adaptor 27 to the left. The piston rod 25 which passes through the housing partition wall 7 in a airtight manner presses its left end against the operating brake piston 11 which in turn causes the piston rod head 13 to move to the left and actuate the braking rigging, which is not shown.

A normal brake release operation of the spring-loaded braking cylinder 3 occurs in a known manner by introducing air under pressure into the chamber 19. The air under pressure in chamber 19 thus acts against piston 17 and causes the piston 17 together with the tubular element 23, coupling pin 29, piston rod 25 and adaptor 27 to be shifted to the right as viewed in FIG. 1 against the force of spring 21. The brake cylinder piston thus returns to its original release position as illustrated in FIG. 1 to bring about a release of the brake as result of the action of return spring 15 acting upon piston 11.

If because of damage or some malfunctioning of the braking system or supply of air under pressure it is not possible to admit air under pressure into the chamber 19 of the spring-loaded brake cylinder when in its braking position, the coupling element 29 is released in a known manner. The release of the coupling element 29 thus enables the action of spring 21 against the operating brake piston 11 to be bypassed.

To release the coupling pin 29, the release mechanism 47 comprising a hex nut is pivoted by means of a suitable tool to bring about a corresponding pivoting of the adaptor 27 in which the coupling pin 29 is retained since the adaptor 27 is connected to the release mechanism 47. The ends of the coupling element 29 within the transverse slots 33 and 49 are thus pivoted into a positon into which the axial portion 31 of the L-shaped slot in piston rod 25 becomes aligned with the coupling pin 29.

If the coupling element 29 is aligned with the axial slot portion 31 without the damping mechanism 35 according to the present invention, then under the force remaining in spring 21 and under the opposite restoring forces in the brake linkage and return spring 15 the piston rod 25 will be abruptly and suddenly shifted to the right within the tubular element 23. This shift would be abruptly terminated when the coupling element 29 engages the left end surface of the axial slot 31. This abrupt stop would produce considerable impact forces which could well result in damage to the brake cylinder. According to the present invention this abrupt and sudden shift to the right upon actuation of the release mechanism is prevented by the damping mechanism 35.

According to the damping mechanism 35, as the piston rod 25 is moved within the tubular member 23 toward the right, the fluid displacing member 37 on the adaptor 27 encounters considerable resistance since the chamber 39 is filled with fluid. As the fluid displacing member 37 and the piston rod 25 is shifted to the right under the action of spring 15, the fluid located to the left of the flange 37 must be pressed through the radial clearance 41 into the space being gradually formed to the right of the flange 37. Because of the relatively small cross-sectional area of the clearance 41 the shifting of the piston rod 25 with respect to the adaptor 27 can be damped.

As an alternative to the radial clearance 41, a plurality of small throttle bore holes or passages may be formed in the flange 37 to provide a passage for the fluid from one side of flange 37 to the other.

Upon conclusion of the damped shift of the piston rod 25 with respect to the adaptor 27, the operating brake piston 11 will be free from the force of spring 21 and can return to its release position as shown in FIG. 1.

Figure 2:
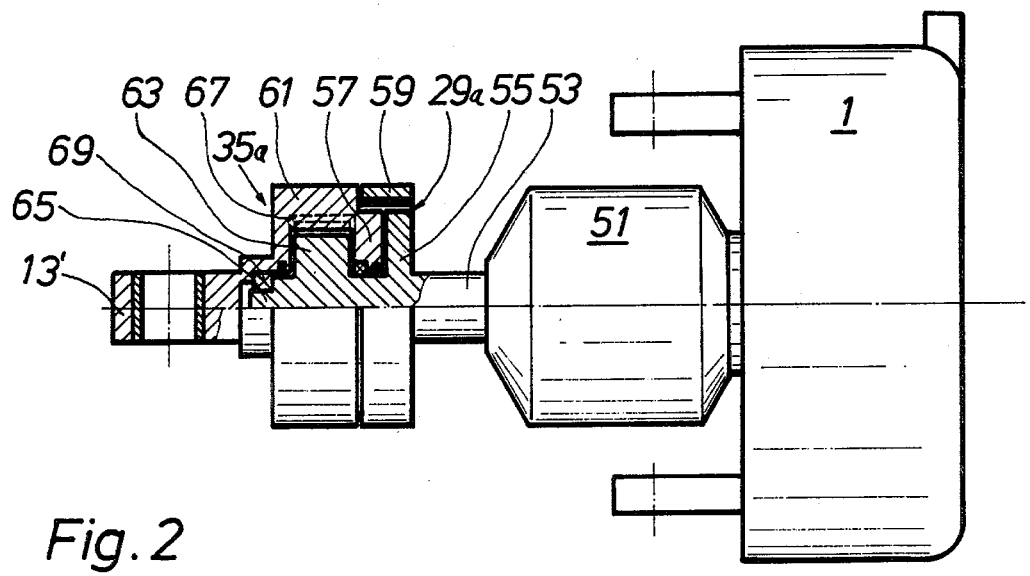
FIG. 2 shows a modification of the invention particularly intended for a spring-loaded brake cylinder having a linkage adjuster.

In FIG. 2 there is illustrated a modification of the damping mechanism as applied to brake cylinder 1 provided with a linkage adjusting mechanism. In FIG. 2, the piston rod extending from the brake cylinder 1 operates by means of a spindle shaft in the linkage adjustment mechanism 51 upon an actuating element 53 to rotate this actuating element. In the braking position of the braking cylinder 1, the threaded spindle shaft is engageable with a stationary clutch nut having a non-self-locking thread and thus the actuating element 53 is acted upon by a force producing rotation. Between the non-rotatable piston rod head 13' and the actuating element 53 there is provided a coupling element 29a with which the damping mechanism indicated at 35a forms a single structural unit.

The coupling element 29a comprises a primary clutch disk 55 which is connected to the actuating element 53. A second clutch disk 57 is of the same diameter as clutch disk 55 and is positioned adjacent thereto in an aligned relationship. Both clutch disks 55 and 57 which are rotatable with respect to each other are encircled by a clutch band 59 extending around their circumferences so that upon tightening of the clutch band 59 both clutch disks 55 and 57 are engaged to rotate together.

The second clutch disk 57 is a component of a stationary pump casing 61 which in turn is connected to the piston rod head 13'. The damping mechanism 35a is in the form of a rotary pump. This rotary pump of the damping mechanism 35a comprises a large pump gear wheel or impeller 63 which is connected over a shaft section 65 with the clutch disk 55 and thus with the actuating element 53. The teeth of the pump gear wheel 63 mesh in a pinion 67 rotatably positioned in a recess formed radially outwardly of the large pump gear wheel 63.

The pump chamber is thus divided into two pump subchambers by the meshing gear wheel 63 and pinion 67. These two sub-chambers are filled with a fluid of a certain viscosity, such as a hydraulic fluid, and are constructed so that the rotation of the pump gear wheel 63 encounters a significant resistance to rotation. The mechanism for supporting and actuating the clutch band 57 is not shown but is supported on the non-rotatable pump housing 61.

The axial movement of the actuating member 53 resulting from the axial movement of the piston within the brake cylinder 1 is transmitted to the piston rod head 13' by a thrust bearing 69 carried by shaft 65 and positioned in a recess formed in the pump housing 61.

The damping mechanism 35a of FIG. 2 operates in the following manner: During service braking as well as during braking of the vehicle to maintain the vehicle in a parked or standstill position utilizing the spring-loaded braking cylinder 1, the first clutch disk 55 is engaged with the second clutch disk 57 by means of the clamped clutch band 59. The non-rotatable piston rod head 13' thus holds the spindle of the adjustment mechanism 51 (the spindle not being shown) non-rotatable by means of the actuating element 53.

The operation of an emergency or rapid release in connection with a linkage adjustment is known in the art and has been described in detail in the patent application DE-OS No. 27 02 874, published July 27, 1978. According to the present invention the damping mechanism 35a begins to operate when the actuating element 53 begins to rotate as result of a rapid release.

If it is necessary for a rapid release of the spring-loaded braking cylinder because of some malfunctioning in the air pressure system as described above, the clutch band 59 is loosened or released and the clutch disks 55 and 57 become disengaged. The clutch disk 55 will now rotate at a high speed with respect to the second clutch disk 57 as result of the screwing of the threaded spindle into the clutch nut of the linkage adjuster mechanism 51 because of the residual force remaining in the spring in the braking cylinder and on the other hand in view of the forces prevailing on the piston rod head 13, such as by elastic deformation (the brake linkage and return spring).

The large pump gear wheel 63 which is connected with the actuating element 53 has its rotation greatly inhibited within the damping mechanism 35a designed as rotary pump. The screwing in of the threaded spindle from the actuating element 53 into the clutch nut of the linkage adjuster mechanism 51 is subjected to a time controlled damping which extends to the phase of the stop ending the rotation of all of the components participating in the rapid release operation.

The rotational resistance to which the pump gear wheel 63 is subjected by means of the fluid within the sub-chambers of the pump housing 61 is dependent upon the particular structure of the meshing teeth within the pump chamber and upon the space within the pump chamber 61 filled with the fluid as well as the quantity and viscosity of the actual fluid which is used. Such fluids may also comprise lubricating grease, hydraulic oils or elastomers.

It is thus apparent, that the damping mechanism 35a in FIG. 2 exerts an impeding force on the rotation of the clutch disk 55 which thus prevents a free rotation of the actuating element 53. Should the actuating element 53 be able to rotate freely without any damping effect, the results would be severe impact forces and stresses upon the sudden and abrupt stop of the components when the screwing in of the threaded shaft within the linkage adjuster mechanism 51 is suddenly terminated.

Thus it can be seen that the present invention has disclosed a damping mechanism for the quick-release mechanism of a spring-loaded brake cylinder. The damping mechanism may be interposed between any two of the relatively moving components and two particular embodiments of the damping mechanism have been disclosed herein. The damping mechanism is characterized by damping the relative movement between two components which results from the release of the coupling mechanism during the quick-release operation.

It will be understood that this invention is susceptible to modification in order to adapt it to different usages and conditions, and accordingly, it is desired to comprehend such modifications within this invention as may fall within the scope of the appended claims.

What is claimed is:

1. In a spring-loaded brake cylinder, a cylinder having a spring-loaded piston therein movable between release and braking positions, piston rod means relatively movable with respect to said piston, a piston rod head adapted to be connected to a brake linkage and actuatable by said piston rod means, a releasable coupling operatively connecting said piston and said piston rod means, and means in parallel with said releasable coupling for damping relative movement between said piston and said piston rod means resulting when said releasable coupling is released, wherein said damping means comprises a chamber defined by portions of said piston and said piston rod means and filled with fluid, and a fluid displaceable member on one of said piston and said piston rod means to moderate any impact force between said piston and said piston rod means as a result of the relative movement therebetween.

2. In a spring-loaded brake cylinder, a cylinder having a spring-loaded piston therein movable between release and braking positions, a tubular element extending axially from said piston and having a transverse slot therein, a tubular piston rod slideably disposed within said tubular element and having a L-shaped slot therein, said L-shaped slot having an axial portion and a transverse portion, an adaptor rotatably and axially movable within said tubular piston rod, said adaptor having an annular flange thereon, a coupling element fixed in said adaptor and extending radially therefrom through said L-shaped slot and said transverse slot to connect said adaptor and piston together for axial movement, said tubular piston rod having first and second axially spaced flanges therein to define a fluid-filled chamber with said adaptor and said adaptor flange disposed between said first and second flanges to displace said fluid to define a damping mechanism, said second flange being further away from said piston than said first flange when said piston is in its release position, said adapator flange being adjacent said second flange when said piston is in its release position.

3. In a spring-loaded brake cylinder as claimed in claim 2 and further comprising means on said adaptor flange for defining a passage interconnecting both portions of said chamber on both sides of said adaptor flange.

4. In a spring-loaded brake cylinder as claimed in claim 3 wherein the adaptor flange has its outer peripheral surface spaced radially from the inner surface of said tubular piston rod to define said passage.

5. In a spring-loaded brake cylinder as claimed in claim 3 wherein said passage comprises a plurality of axial bores through said adaptor flange.

* * * * *